United States Patent [19]
Tamagni et al.

[11] Patent Number: 6,099,888
[45] Date of Patent: Aug. 8, 2000

[54] PROCESS FOR PRODUCING STOCK CUBES

[75] Inventors: Paolo Tamagni, Wangen; Henricus Kremers, Madetswil; Felix Hepfer, Thayngen, all of Switzerland

[73] Assignee: Bestfoods, Englewood Cliffs, N.J.

[21] Appl. No.: 09/375,762

[22] Filed: Aug. 18, 1999

[51] Int. Cl.[7] .................................. A23L 1/40; A23P 1/00
[52] U.S. Cl. ............................ 426/589; 426/516
[58] Field of Search .................... 426/589, 516, 426/99, 103, 285

[56] References Cited

U.S. PATENT DOCUMENTS

| | | | |
|---|---|---|---|
| 215,944 | 5/1879 | Liebert | 426/589 |
| 236,284 | 1/1881 | Warren | 426/589 |
| 428,502 | 5/1890 | Maggi | 426/589 |
| 994,885 | 6/1911 | Sulzberger | 426/589 |
| 1,007,142 | 10/1911 | Rademacher | 426/589 |
| 2,168,360 | 8/1939 | Musher | 426/589 |
| 2,278,466 | 4/1942 | Musher | 426/589 |
| 2,358,598 | 9/1944 | Scherer | 99/124 |
| 2,376,485 | 5/1945 | Hermann et al. | 99/124 |
| 2,445,752 | 7/1948 | Adams | 99/171 |
| 2,704,521 | 3/1955 | Sharp et al. | 107/14 |
| 3,300,319 | 1/1967 | Marotta et al. | 99/144 |
| 3,336,139 | 8/1967 | Mech et al. | 99/124 |
| 3,431,112 | 3/1969 | Durst | 99/1 |
| 3,652,299 | 3/1972 | Penton | 99/144 |
| 3,769,029 | 10/1973 | Ganz | 426/342 |
| 3,966,993 | 6/1976 | Luck | 426/589 |
| 3,987,207 | 10/1976 | Spaeti et al. | 426/99 |
| 4,038,424 | 7/1977 | Davies | 426/94 |
| 4,060,645 | 11/1977 | Risler et al. | 426/302 |
| 4,073,961 | 2/1978 | Gasser et al. | 426/589 |
| 4,118,518 | 10/1978 | Perryman | 426/516 |
| 4,310,560 | 1/1982 | Doster et al. | 426/285 |
| 4,578,274 | 3/1986 | Sugisawa et al. | 426/96 |
| 4,936,200 | 6/1990 | Buhler et al. | 99/353 |
| 5,127,953 | 7/1992 | Hamaguchi | 106/504 |
| 5,208,062 | 5/1993 | Sugisawa et al. | 426/589 |
| 5,451,421 | 9/1995 | Tanihara et al. | 426/589 |
| 5,895,675 | 4/1999 | Carment et al. | 426/99 |

FOREIGN PATENT DOCUMENTS

| | | |
|---|---|---|
| 0 484 707 A1 | 5/1992 | European Pat. Off. . |
| 0 775 446 A2 | 5/1997 | European Pat. Off. . |
| 20734070 | 2/1997 | Russian Federation . |
| 1 498 120 | 1/1978 | United Kingdom . |

*Primary Examiner*—Cynthia L. Nessler
*Attorney, Agent, or Firm*—Norris, McLaughlin & MArcus

[57] ABSTRACT

The invention relates to a process for producing stock cubes by mixing ingredients comprising salt, fat, extract and, if appropriate, water and also other customary additives. The mixing is performed by continuous addition of the constituents one after the other in an extruder. An amount of fat which is reduced in comparison with customary formulations of 4–35%, in particular 5–25%, preferably 8–12%, based on the total mixture, being used. The mixture is continuously processed in the extruder and is extruded through a shaping die to form a dimensionally stable extrudate having a density of 1.0–2.0 g/cm$^3$, preferably 1.2–1.7 g/cm$^3$, and the extrudate is portioned into individual pieces which are packaged.

8 Claims, No Drawings

6,099,888

PROCESS FOR PRODUCING STOCK CUBES

BACKGROUND OF INVENTION

1. Field of Invention

The invention relates to stock products in general including seasonings.

2. Description of the Related Art

Stock products are generally products produced from, optionally, meat, meat extract, protein hydrolysates, fats, vegetables and/or vegetable extracts with addition of salt, herbs and/or seasonings. The best-known stock products are meat stock products, such as, for example, meat stock produced from meat (including poultry and game) and/or meat extract with addition of fats, vegetables or vegetable extracts, seasonings, herbs and salt. Prepared in advance industrially, these are offered in granular or powder or paste form. The invention relates to stock products generally, including seasonings, and meat stock products in particular in paste form. Stock cubes are taken to mean here products which are marketable in individual portions or packaged pasty products without regard to their geometric size, that is they can be present in cubes, in parallelepipeds, in the form of tablets or any other three-dimensional shape. The term "paste form" includes a wide consistency range and comprises pasty products, as are customarily packaged in tubes, and also relatively solid products which can only be deformed under strong pressure, such as conventional soup cubes. Bouillon cubes are among the most preferred embodiments of the present invention.

The invention relates to a process for producing stock cubes which can be converted by the consumer by dispersion in water and, if appropriate, heating, into stock products, for example a ready-to-eat meat broth.

Stock cubes of this type have hitherto been prepared in the batch process, the starting products having been mixed to form a batch, which had to be stored for a relatively long time, for example 6–24 hours at room temperature, to age and it was only then converted by extrusion and/or pressing into the typical marketable cube shape.

Batch processes of this type are disadvantageous, not only because of the process duration, but also because of the quality variations from batch to batch as a function of the critical ageing time and temperature of the large batch volume and because of the equipment requirements.

The use of extruders in the food industry is widely known. Thus, EP-A1 484707 relates to a machine for extruding a food paste, as is typically used for producing pancakes or doughnuts.

GB-B 1498120 discloses dehydrated foodstuffs, in particular including broths, which are to be instantly soluble in water. To achieve this solubility, they are to be present as grains having a porous structure, having a density of 30–600 g/l. Products of this type can be produced by extruding the mass into a chamber in which a subatmospheric pressure prevails.

EP-A2-775 446 relates to an assembled confectionery product based on fat, for example, chocolate, which is produced by extrusion with the use of pressure.

RU 2073470 C1 describes the manufacture of a semi-finished sauce product by mixing the components during 8–10 minutes and subsequently extruding the mass into the form of batons.

These publications give no indications as to how the problems in the production of stock cubes can be solved which usually are manufactured by a batch-process including a lengthy ripening period.

It has now been found that stock cubes of this type can advantageously be produced continuously, with not only engineering advantages being achieved, but also advantages in the product. The products produced according to the invention are frequently distinguished by a higher water solubility than compressed cubes produced in a conventional manner, they are surprisingly homogeneous and of constant quality and can be packaged simply and continuously. Furthermore, stock cubes having a relatively low fat content can also be produced according to the invention.

SUMMARY OF THE INVENTION

The process according to the invention for producing stock cubes by mixing the constituents comprising salt, fat, extract and, if appropriate, water and also other customary additives, is characterized in that the mixing is performed by continuous addition of the constituents one after the other in an extruder, an amount of fat which is reduced in comparison with customary formulations of 4–35%, in particular 5–25%, more particular 5–20% and preferably 8–12%, based on the total mixture, being used, the mixture continuously processed in the extruder which is cooled sufficiently to cause crystallisation of the fat in the mixture already within the extruder, being extruded through a shaping die to form a dimensionally stable extrudate having a density of 1.0–2.0 g/cm$^3$, preferably 1.2–1.7 g/cm$^3$, and the extrudate being portioned to the individual pieces which are packaged.

DETAILED DESCRIPTION OF THE INVENTION

It is surprising that, according to the invention, a homogeneous product of constant quality can be continuously produced without an ageing time and packaged. The process according to the invention is expediently carried out in an essentially horizontal twin-screw extruder. The extruder is to operate under shear conditions as low as possible and avoiding a high pressure build-up. Expediently, a typical mixing extruder is used which does not build up pressure or builds up only a low pressure.

The constituents are introduced into the extruder separately one after the other although some may be added jointly.

Seasonings, salt and additions such as glutamate, separately or premixed, are introduced first into the extruder through feed funnels. The liquid extract, for example meat extract and vegetable extract, which can also be added in powder form, however, is then added. The fat, which can be fed in liquefied form to the extruder screw, is added next. Finally, the garnishes are added, such as vegetable strips or herbs e.g. parsley, which are added to the paste under mild conditions.

Since the processing is performed continuously, the specified sequence is to be taken to mean that the first component is introduced at the end of the screw remote from the die, and the last component at the end near the die. The salt is therefore in the screw for the longest time, and the garnishing agent for the shortest.

If the extract is added in liquid form, it has proved to be expedient to introduce the extract in a slightly heated form at a temperature of 25–30° C. The fat component must always be introduced at elevated temperature, advantageously at a temperature of 40–60° C., in particular 45–50° C.

While the constituents are processed in the screw to form a homogeneous paste they are subject to a temperature process which is controlled by means of the extruder housing being cooled externally. With a customary extruder length, the coolant is kept at a temperature between −20 and +20° C., so that the extrudate at the die end has a temperature of 10–35° C., preferably below 30° C., and most preferably below 26° C., in particular 10–25° C.

This manner also means that the extrudate strip achieves a stable consistency a few seconds after its extrusion.

Food grade fats suitable for the process are particularly those having a melting point in the range 32–51° C.

By means of the process according to the invention, in particular a stock cube having a low fat content of 5–25%, preferably 8–12%, can be produced.

The mixture to be extruded can also have a low water content of generally 0.25–6% by weight, preferably 2–4.5% by weight. This water content is essentially introduced by the liquid extract or water. Such a water content leads to a lower water activity ($a_W$), generally in the range from 0.2 to 0.65, which is advantageous for the product keeping quality.

The process variables can be set in such a manner that a stable, dimensionally-stable pasty extrudate is extruded which has a density of 1.0–2.0 g/cm³, preferably 1.2–1.7 g/cm³. The extrudate can be portioned directly to give individual pieces and packaged continuously directly, if appropriate a defined shape can further be imposed on the extrudate.

An expedient mixing ratio for the constituents is 48–65%, preferably 48–52% by weight of salt, 15–22%, preferably 18–22% by weight of mono-sodium glutamate, 5–20% preferably 5–17% by weight of fat and 3–10%, preferably 5–10% by weight of water and/or liquid extracts having a water content of at most 60%. Optionally, 5–20% by weight, preferably 5–10% by weight, of seasonings, herbs, vegetable garnish and/or dry extracts can further be added.

All percentages, if not stated otherwise, are by weight/weight.

The solid or liquid extracts which are incorporated into the mixture may be any meat or vegetable extracts and/or other extracts useful as seasonings.

EXAMPLE 1

Salt (52%), liquid fat (10%) and liquid meat extract (10%) were added one after the other into a twin-screw extruder which was working with a shear force of 105 Nm and a throughput of 60 kg/h. The extruder was cooled externally with a coolant having a temperature of 11° C.

The pressure at the die was 9 bar.

The product emerged from the extruder die with a temperature of 22° C.

EXAMPLE 2

Salt (56%), liquid fat (10%) and liquid meat extract (9%) were added one after the other into a twin-screw extruder which was working with a shear force of 90 Nm and a throughput of 60 kg/h. The extruder was cooled externally with a coolant having a temperature of 9° C.

The pressure at the die was 9–17 bar.

The product emerged from the extruder die with a temperature of 23° C.

EXAMPLE 3

Salt (56%), monosodium glutamate (21%) and seasonings (3%) were introduced first into a twin-screw extruder, thereafter liquid meat extract (9%) and finally liquid fat (10%).

The extruder was working with a shear force of 150 Nm and a throughput of 180 kg/h. The extruder was cooled externally with a coolant having a temperature of −2° C.

The pressure at the die was 9 bar.

The product emerged from the extruder die with a temperature of 30° C.

We claim:

1. Process for producing stock cubes by mixing ingredients comprising salt, fat, extract and, optionally, water and other additives, wherein mixing is performed by continuous addition of the ingredients into an extruder to make a mixture, the fat comprising 5–25% based on the total weight of the mixture, continuously processing the mixture in the extruder which is cooled sufficiently to cause crystallisation of the fat within the extruder, extruding the mixture through a shaping die to form a dimensionally stable extrudate having a density of 1.0–2.0 g/cm³.

2. The process of claim 1 wherein the extrudate is portioned into individual pieces which are packaged.

3. The process of claim 1 wherein the extruder is a twin-screw extruder.

4. The process of to claim 1 wherein the extruder operates under low shear conditions.

5. The process of to claim 1 wherein the extrudate has a temperature of 10–35° C. at the die end.

6. The process of claim 1 wherein the fat is added to the mixture in liquid form.

7. The process of claim 1 wherein a fat having a melting point in the range 32–51° C. is used.

8. The process of claim 1 wherein a mixture comprising 48–65% salt, 5–20% fat, 3–10% water and/or liquid extracts, 15–22% monosodium glutamate and 5–20% seasonings and/or dry extracts is extruded.

* * * * *